(12) United States Patent
Davies et al.

(10) Patent No.: US 10,573,089 B2
(45) Date of Patent: Feb. 25, 2020

(54) SYSTEMS, METHODS, AND TOOLS FOR SPATIALLY-REGISTERING VIRTUAL CONTENT WITH PHYSICAL ENVIRONMENT IN AUGMENTED REALITY PLATFORMS

(71) Applicant: THE BOEING COMPANY, Chicago, IL (US)

(72) Inventors: Paul Robert Davies, Long Beach, CA (US); David Lee, Garden Grove, CA (US); Gabriel Joseph Evans, Carroll, IA (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 15/808,074

(22) Filed: Nov. 9, 2017

(65) Prior Publication Data
US 2019/0139320 A1     May 9, 2019

(51) Int. Cl.
*G09G 5/00*     (2006.01)
*G06T 19/20*     (2011.01)
(Continued)

(52) U.S. Cl.
CPC ............ *G06T 19/20* (2013.01); *B64F 5/60* (2017.01); *G01B 5/004* (2013.01); *G06F 3/011* (2013.01);
(Continued)

(58) Field of Classification Search
CPC ............ G06F 3/0346; G06F 3/0383; G06F 2203/0384; G06T 19/006; G06T 2200/04;
(Continued)

(56) References Cited

U.S. PATENT DOCUMENTS 6,675,040 B1    1/2004   Cosman
2008/0123910 A1    5/2008   Zhu
(Continued)

FOREIGN PATENT DOCUMENTS

EP        2728548 A2    5/2014
EP        3095595 A1    11/2016
WO    2017015738 A1    2/2017

OTHER PUBLICATIONS

Coppens "Merging Real and Virtual Worlds: An Analysis of the State of the Art and Practical Evaluation of Microsoft Hololens" University of Mons; 2017; 87 pages.
(Continued)

*Primary Examiner* — Jennifer T Nguyen
(74) *Attorney, Agent, or Firm* — Philip S. Hof; The Small Patent Law Group, LLC

(57) ABSTRACT

A system includes an alignment tool and an augmented-reality (AR) imaging device. The alignment tool has a pointer and a fiducial marker, and is carried by an operator within a physical workspace. The AR imaging device tracks the fiducial marker in the physical workspace using one or more sensors, and determines positional coordinates of the pointer at physical reference locations within the physical workspace based on a position and orientation of the fiducial marker. The physical reference locations are associated with different virtual reference points within a virtual model. The AR imaging device generates a transfer function to fit positional coordinates of the virtual reference points with the positional coordinates of the associated physical reference locations, and displays virtual content on a display according to the transfer function such that the virtual content is spatially-registered with the physical workspace.

22 Claims, 8 Drawing Sheets

(51) Int. Cl.

| | | |
|---|---|---|
| *G06T 7/73* | (2017.01) | |
| *G06T 7/246* | (2017.01) | |
| *G06F 3/02* | (2006.01) | |
| *G06F 3/038* | (2013.01) | |
| *G06T 19/00* | (2011.01) | |
| *B64F 5/60* | (2017.01) | |
| *G06F 3/0346* | (2013.01) | |
| *G06F 3/01* | (2006.01) | |
| *G01B 5/004* | (2006.01) | |
| *G05B 19/042* | (2006.01) | |

(52) U.S. Cl.
CPC .............. *G06F 3/02* (2013.01); *G06F 3/0346* (2013.01); *G06F 3/0383* (2013.01); *G06T 7/248* (2017.01); *G06T 7/74* (2017.01); *G06T 7/75* (2017.01); *G06T 19/006* (2013.01); *G05B 19/042* (2013.01); *G05B 2219/32014* (2013.01); *G06F 2203/0384* (2013.01); *G06T 2200/04* (2013.01); *G06T 2207/10032* (2013.01); *G06T 2207/30204* (2013.01); *G06T 2219/2004* (2013.01)

(58) Field of Classification Search
CPC . G06T 2207/10032; G06T 2207/30204; G06T 2219/2004; G02B 27/0172
USPC ............................................ 345/8, 156, 169
See application file for complete search history.

(56) References Cited

U.S. PATENT DOCUMENTS

| | | | | |
|---|---|---|---|---|
| 2014/0118339 | A1* | 5/2014 | Davies | ..................... G06T 3/60 |
| | | | | 345/419 |
| 2014/0207862 | A1* | 7/2014 | Domke | ................. H04L 65/403 |
| | | | | 709/204 |
| 2019/0122438 | A1* | 4/2019 | Petrovskaya | ......... G06T 19/006 |

OTHER PUBLICATIONS

Higgins "HoloLens App Lays 3D BIM Models over the Real World-Fast" SPAR 3D; 2017 3 pages.
Dberrett "Poster Calibration Sample" Microsoft Mixed Reality Companion Kit; 2017; 2 pages.
Qian ARToolKIT on HoloLens; Long Qian Blog; 2017; 5 pages.
Extended European Search Report for corresponding EP Application No. 182047522-1216 dated Mar. 28, 2019 (10 pages).

* cited by examiner

SYSTEMS, METHODS, AND TOOLS FOR SPATIALLY-REGISTERING VIRTUAL CONTENT WITH PHYSICAL ENVIRONMENT IN AUGMENTED REALITY PLATFORMS

FIELD

Embodiments of the present disclosure generally relate to augmented reality platforms, and, more specifically, to aligning virtual content with physical environments or workspaces, such as an interior space of an aircraft or other vehicles, in augmented reality platforms.

BACKGROUND

Augmented reality platforms are computer-based systems that superimpose virtual content onto a display showing a live view of a physical, real-world environment to a user, thereby providing a composite view of both the physical environment and the virtual content. The live view may be provided as a video feed on a display or by using translucent, see-through displays or lenses, such that the user is able to see the physical environment through the display. Augmented reality can be useful in many different applications, such as gaming, education, and military. One specific useful application of augmented reality is for providing instructional tasks. For example, the overlaid virtual content may visually guide an operator when performing certain tasks, such as vehicle, computer, or other machine assembly, vehicle, computer, or other machine repairs, medical procedures, furniture assembly, and the like. The virtual content in the composite view typically needs to accurately align with the physical environment in order to provide supportive guidance for the instructional tasks, even as the operator moves within the physical environment. For example, if the virtual content does not accurately align with the physical environment, the guidance provided by the virtual content during performance of the instructional task may be confusing and misleading to the user, and may result in costly errors.

One known method for aligning virtual content with the physical, real-world environment in an augmented reality platform requires technical skill of an operator. For example, a user may be required to manually translate and angularly orient a virtual object via the use of a keyboard, touchpad, controller device, mouse, hand gestures, or the like, until the virtual object aligns with a physical monument in the physical environment. Moreover, such manual alignment can be tedious and time-consuming, as well as imprecise and inaccurate because the process relies on the skill of the operator and is prone to human error.

SUMMARY

The embodiments disclosed herein take these and other factors into consideration. Certain embodiments of the present disclosure provide a system for aligning virtual content with a physical workspace or environment in an augmented reality platform. The system includes an alignment tool and an augmented-reality (AR) imaging device. The alignment tool has a pointer and a fiducial marker. The alignment tool is configured to be carried by an operator within a physical workspace. The AR imaging device includes one or more sensors and one or more processors. The one or more processors are configured to track the fiducial marker in the physical workspace using the one or more sensors, and determine positional coordinates of the pointer at physical reference locations within the physical workspace based on a position and orientation of the fiducial marker that is tracked. The physical reference locations are associated with different virtual reference points within a virtual model. The one or more processors are further configured to generate a transfer function to fit positional coordinates of the virtual reference points with the positional coordinates of the associated physical reference locations. The one or more processors display virtual content on a display according to the transfer function such that the virtual content is spatially-registered with the physical workspace.

Certain embodiments of the present disclosure provide a method for aligning virtual content in an augmented reality platform. The method includes tracking, using an augmented-reality (AR) imaging device, a fiducial marker on an alignment tool carried by an operator within a physical workspace. The method includes determining positional coordinates of a pointer tip of the alignment tool at multiple physical reference locations within the physical workspace. The positional coordinates are determined based on a position and orientation of the fiducial marker tracked by the AR imaging device. The physical reference locations within the physical workspace are associated with different virtual reference points within a virtual model. The method also includes generating a transfer function to fit positional coordinates of the virtual reference points with the positional coordinates of the associated physical reference locations. The method further includes displaying virtual content on a display according to the transfer function such that the virtual content is spatially-registered with the physical workspace.

Certain embodiments of the present disclosure provide an alignment tool for spatially-registering virtual content with a physical workspace on a display using an augmented-reality (AR) imaging device is provided. The alignment tool includes a handle configured to be held by an operator, a frame attached to the handle, and a pointer. The frame has a front side and a rear side that is opposite the front side. The frame has a fiducial marker along the front side that is configured to be recognized by the AR imaging device. The pointer is disposed rearward of the rear side of the frame and extends away from the frame to a tip of the pointer at a distal end of the pointer. The tip is located at a fixed, predetermined position relative to the fiducial marker, such that the AR imaging device determines a position of the tip within the physical workspace by tracking a position and orientation of the fiducial marker.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

Figure 1:
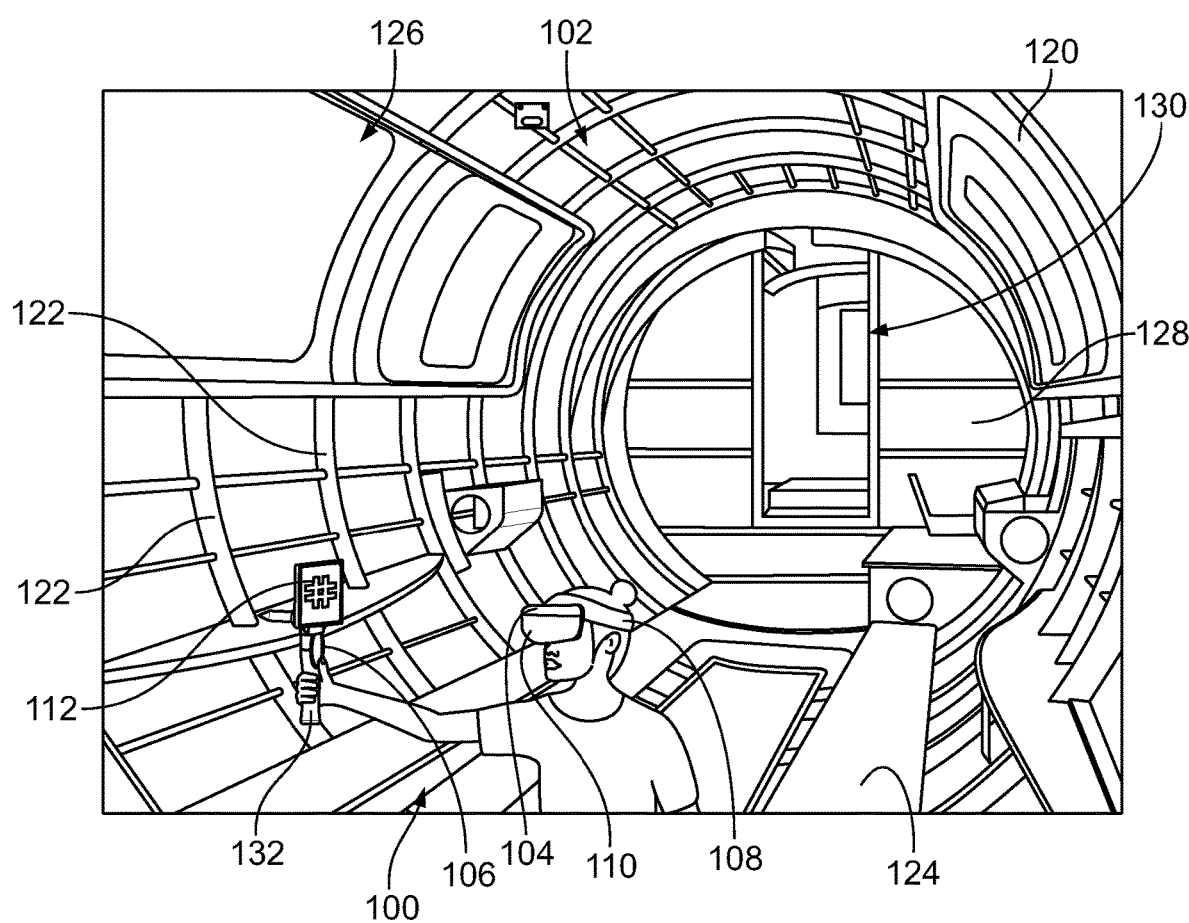
FIG. 1 illustrates an operator using a virtual content alignment system in a physical workspace according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

A need exists for a system and method that accurately and efficiently align virtual content with the physical environment in an augmented reality platform, and can be used for virtual content of any size without affecting the accuracy of the alignment. A need also exists for a system and method that accurately align a first virtual object with the physical environment in an augmented reality platform, and can be used to automatically and efficiently align additional virtual objects with the physical environment without repeating the alignment process or re-calibrating.

With those needs in mind, certain embodiments of the present disclosure provide a virtual content alignment system for accurately aligning virtual content with a physical workspace or environment in an augmented reality platform. The term "physical workspace" is used broadly herein to refer to any physical environment that can be tracked or mapped via an inside-out sensing system in an augmented-reality (AR) imaging device carried or worn by a human operator. For example, a physical workspace may be a confined space within a vehicle or building that is partially or fully enclosed by walls, a floor, and/or a ceiling. A physical workspace may also include outdoor spaces.

As described in the one or more embodiments described herein, the virtual content alignment system is configured to visually track a custom handheld alignment tool carried by an operator while the operator uses the alignment tool to touch particular locations (e.g., reference locations) in the physical workspace. The reference locations touched by the alignment tool are particularly selected because the reference locations correspond to associated reference points in a virtual model, such as a virtual model of the physical location generated using a software program on a computing device. The virtual content alignment system is configured to determine positional coordinates of the physical locations touched by the alignment tool within a physical or spatial coordinate system that maps the physical workspace. By comparing the positional coordinates of the physical reference locations within the spatial coordinate system to the positional coordinates of the associated virtual reference points within a virtual coordinate system, a transfer function is generated to fit or align the virtual coordinate system with the spatial coordinate system. The transfer function may be used to display virtual content on a display concurrently with a live view of the physical workspace, such that the virtual content is spatially-registered (e.g., aligned) with the physical workspace. The live view may be provided by a video feed or by using a translucent display that allows a user to see the physical workspace through the display.

FIG. 1 illustrates an operator using a virtual content alignment system 100 in a physical workspace 102 according to an embodiment. The virtual content alignment system 100 (also referred herein to as alignment system 100) includes an augmented reality imaging device 104 (referred to herein as AR imaging device 104) and an alignment tool 106. In the illustrated embodiment, the operator is carrying both the AR imaging device 104 and the alignment tool 106. For example, the AR imaging device 104 is a head-mounted device worn on the head of the operator, and the alignment tool 106 is handheld by the operator. The alignment tool 106 has a handle 132 that is grasped and held by the operator to carry the tool 106 within the workspace 102. In the illustrated embodiment, the AR imaging device 104 includes a band or strap 108 that engages and extends around the head of the operator, but in other embodiments the AR imaging device 104 may include a helmet, a hat, side arm members (as in eyeglasses) with respective ear pieces, or the like, instead of the band 108. The AR imaging device 104 in the illustrated embodiment is also an optical see-through device such that the AR imaging device 104 includes a transparent or translucent visor 110 that covers the eyes of the operator. The AR imaging device 104 is not limited to head-mounted devices though, and may include other wearable, portable, and/or mobile devices, such as computer tablets, smartphones, smartwatches and the like that are configured to utilize inside-out tracking systems for augmented reality platforms. In an alternative embodiment, a first operator may carry the alignment tool 106 in the physical workspace 102, and a second operator may wear or carry the AR imaging device 104 in the physical workspace 102.

The AR imaging device 104 is configured to perform inside-out positional tracking. For example, the AR imaging device 104 includes one or more sensors 406 (shown in FIG. 4), such as one or more image/video cameras, range finders (e.g., proximity sensors), infrared (IR) sensors, or the like. As the operator wears or carries the AR imaging device 104 within the physical workspace 102, the sensors 406 collect sensor data (e.g., image data and/or proximity data) of the workspace 102. The AR imaging device 104 includes one or more processors 410 (shown in FIG. 4) that analyze the sensor data to infer the position and orientation of the AR imaging device 104 (and the operator) relative to the workspace 102. The physical workspace 102 may be within a fuselage 120 of an aircraft that has a cylindrical shape formed by a series of curved frame members 122. The fuselage 120 in the illustrated embodiment also includes a floor 124, a window 126, and a back wall 128 defining a doorway 130. As the operator moves within the fuselage 120, the AR imaging device 104 is configured to track changes in the proximity and angle of the AR imaging device 104 relative to certain features of the fuselage 120, such as to the doorway 130 and/or the window 126. Based on the perceived changes in the fuselage 120 surrounding the AR imaging device 104, the AR imaging device 104 calculates movement (e.g., translation and/or rotation) of the operator and determines a current position and orientation of the operator within the fuselage 120. The AR imaging device 104 may perform inside-out positional tracking as the sensors 406 "look" from the position of the operator (e.g., from the inside) outward toward the surrounding workspace 102.

The AR imaging device 104 is also configured to display virtual content for the operator by superimposing the virtual content onto a display showing a live view of the physical workspace or environment. The virtual content may be, or otherwise include, images, symbols, glyphs, three-dimensional objects, or the like. The AR imaging device 104 may be one of various known augmented reality-specific devices on the market, such as the Microsoft™ Hololens™, the DAQRI™ Smart Helmet™, the Meta™ Meta II™, or the like. Alternatively, as described above, the AR imaging device 104 may be a tablet computer, smartphone, or the like that has the sensors and processing capability to perform inside-out positional tracking for augmented reality platforms. In one embodiment, the live view may be provided by superimposing the virtual content on a transparent or translucent display that functions similar to eyeglass lenses, such that the operator is able to see the real-world through the display. In another embodiment, the live view may be provided by displaying a live video feed of the surrounding environment on a display device.

Although augmented reality has numerous applications, one or more such applications utilize augmented reality for instructional purposes to guide an operator during a task. The task may relate to manufacturing, building, maintenance, inspection, training, repairs, and the like. For example, augmented reality may be used to guide complex and/or difficult labor tasks by selectively displaying virtual instructional information that guides the operator through the task. Using augmented reality to guide complex and/or difficult tasks may increase work output and reduce cost by reducing the number of errors and the duration of the task. However, if the virtual content does not align properly with the physical environment, the augmented scene may further complicate the task. For example, the operator may be misguided, or at least confused, by instructional virtual content that is misaligned with the physical environment. The alignment system 100 described herein is configured to efficiently and accurately align virtual content with the physical workspace in an augmented reality platform, ensuring that the instructional virtual information is properly spatially-registered with the physical workspace in the live view displayed to the operator.

The AR imaging device 104 is configured to track the alignment tool 106 within the physical workspace 102. The alignment tool 106 includes a fiducial marker 112 that is used by the AR imaging device 104 to track the alignment tool 106. The fiducial marker 112 is a graphic indicia, such as a color, symbol, image, text, shape, bar code, or the like. In the illustrated embodiment, the fiducial marker 112 is a number sign ("#"). The AR imaging device 104 is configured (e.g., programmed or trained) to recognize and detect the fiducial marker 112 in image data captured by the one or more sensors 406. Using image analysis, the AR imaging device 104 is also configured to determine the distance and angular orientation of the fiducial marker 112 relative to the AR imaging device 104. For example, the AR imaging device 104 detects the alignment tool 106 moving away from the AR imaging device 104 responsive to a detected reduced size of the fiducial marker 112 relative to the size of the fiducial marker 112 in prior image data. In one or more embodiments, the AR imaging device 104 may track certain objects in the workspace 102 for determining the position and orientation of the AR imaging device 104 within the workspace 102, and may track the fiducial marker 112 for determining the position and orientation of the alignment tool 106 relative to the AR imaging device 104. Based on this information, the AR imaging device 104 may calculate the position and orientation of the fiducial marker 112 relative to the workspace 102.

Figure 2:
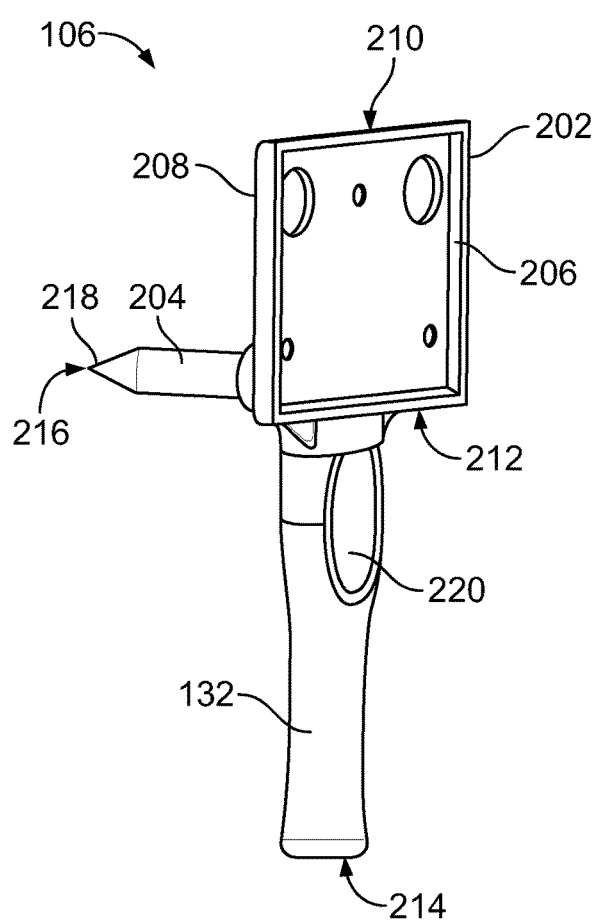
FIG. 2 is a perspective view of an alignment tool of the virtual content alignment system according to an embodiment of the present disclosure.

FIG. 2 is a perspective view of the alignment tool 106 according to an embodiment, shown without the fiducial marker 112 (FIG. 1). The alignment tool 106 is used for collecting reference locations in the physical workspace 102 (FIG. 1), as described in more detail herein. The alignment tool 106 includes the handle 132, a frame 202, and a pointer 204. The frame 202 has a front side 206 and a rear side 208 that is opposite to the front side 206. The fiducial marker 112 is configured to be mounted along the front side 206 of the frame 202. For example, the fiducial marker 112 may be an image on paper or another substrate that is mounted to the front side 206 of the frame 202 via an adhesive, a clip, or another type of fastener. In an alternative embodiment, the fiducial marker 112 may be formed integrally on the front side 206 of the frame 202, such as painted onto the front side 206, molded along the front side 206, or defined by excising portions of the frame 202 surrounding the fiducial marker 112.

The frame 202 has a first end 210 and a second end 212 that is opposite to the first end 210. The handle 132 is attached to the frame 202 at the second end 212 and extends away from the frame 202 to a distal end 214 of the handle 132. In the illustrated embodiment, the first end 210 is a top end of the frame 202, and the second end 212 is a bottom end. As used herein, relative or spatial terms such as "top," "bottom," "front," "rear," "upper," and "lower" are only used to distinguish the referenced elements and do not necessarily require particular positions or orientations relative to gravity or to the surrounding environment of the alignment tool 106. In the illustrated embodiment, the handle 132 is a cylindrical shaft that extends linearly from the second (e.g., bottom) end 212 of the frame 202 to the distal end 214. The handle 132 optionally has a contoured perimeter to ergonomically accommodate the hand of the operator. In an alternative embodiment, the handle 132 may be curved and/or have a different shape.

The pointer 204 is disposed rearward of the rear side 208 of the frame 202 and extends away from the frame 202 to a distal end 216 of the pointer 204. The pointer 204 includes a tip 218 at the distal end 216 that tapers to a point. The pointer 204 is shown in more detail in FIG. 3.

Figure 3:
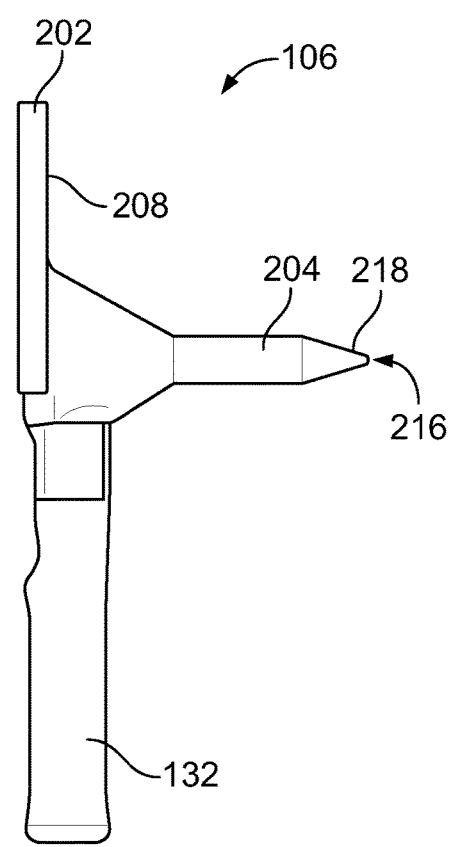
FIG. 3 is a side view of the alignment tool according to an embodiment of the present disclosure.

FIG. 3 is a side view of the alignment tool 106 according to an embodiment. The pointer 204 in the illustrated embodiment extends linearly from the rear side 208 of the frame 202 to the distal end 216. In an embodiment, the pointer 204 extends generally perpendicular to the orientation of the handle 132. For example, the pointer 204 is "generally perpendicular" to the handle 132 such that the angle between an axis of the pointer 204 and an axis of the handle 132 may be within a range of plus or minus five or ten degrees from a right angle (e.g., between 80° and 100°). The tip 218 of the pointer 204 is fixed in place relative to the frame 202, and is located at a predetermined position relative to the frame 202. For example, the pointer 204 may extend a predetermined distance from the frame 202 at a predetermined angle relative to a plane of the front side 206 of the frame 202, such as 90 degrees. When the fiducial marker 112 is mounted to the frame 202, the tip 218 of the pointer 204 is located at a predetermined position relative to the fiducial marker 112. Since the position and orientation of the pointer 204 relative to the fiducial marker 112 is known, the AR imaging device 104 is configured to determine the position of the tip 218 of the pointer 204 within the workspace 102 by tracking the position and orientation of the fiducial marker 112. In an alternative embodiment, the pointer 204 may extend rearward directly from the handle 132 instead of from the frame 202.

In an embodiment, the alignment tool 106 has a material composition that includes one or more plastics or other polymeric materials. The alignment tool 106 may be composed of one or more metals or other materials in other embodiments. The handle 132, pointer 204, and frame 202 may be integrally formed with one another during a common molding process, or may be separately formed and subsequently assembled to define the alignment tool 106.

Referring now back to FIG. 2, the alignment tool 106 in the illustrated embodiment includes a selection button 220 on the handle 132. The selection button 220 is configured to be triggered by a thumb or other finger of the operator while grasping the handle 132. The operator may trigger the button 220 by depressing the button 220 radially inward towards an interior of the cylindrical handle 132. The selection button 220 is optional, and one or more alternative embodiments of the alignment tool 106 may lack the button 220.

Figure 4:
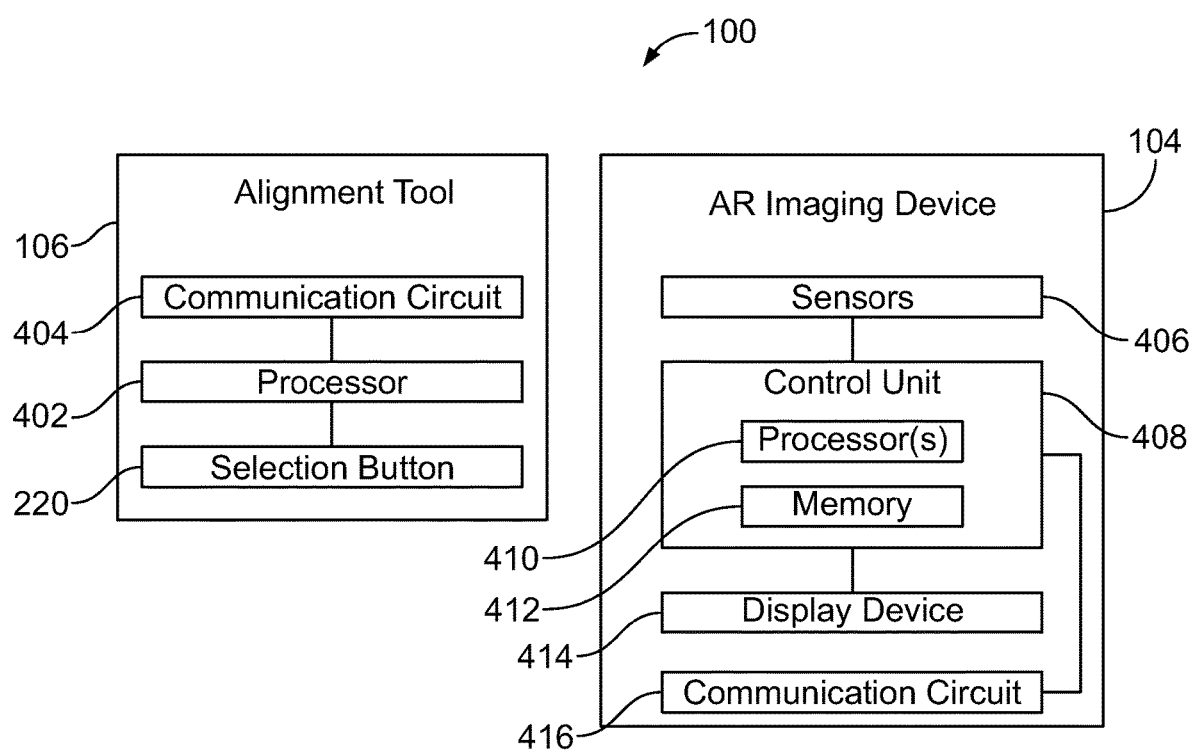
FIG. 4 illustrates a block diagram of the virtual content alignment system according to an embodiment of the present disclosure.

FIG. 4 illustrates a block diagram of the virtual content alignment system 100 according to an embodiment. The block diagram shown in FIG. 4 shows a non-limiting example embodiment of the sub-components within the alignment system 100. The alignment system 100 in other embodiments may include fewer components, additional components, and/or different components than the components illustrated in FIG. 4.

The alignment tool 106 includes the selection button 220 and associated circuitry, a processor 402, and a wireless communication circuit 404. The processor 402 and the wireless communication circuit 404 may be contained within the handle 132 (shown in FIG. 3) of the alignment tool 106. The processor 402 is configured to control operation of the wireless communication circuit 404. The wireless communication circuit 404 may include an antenna and associated circuitry for generating wireless radio-frequency signals to communicate (e.g., transmit and/or broadcast) to the AR imaging device 104 and/or another computing device. For example, the wireless communication circuit 404 may include a transceiver, a transmitter, or the like. In one or more embodiments, responsive to the operator activating (e.g., pressing, toggling, rotating, etc.) the selection button 220, the processor 402 controls the wireless communication circuit 404 to generate and wirelessly communicate a data acquisition command signal to the AR imaging device 104. The wireless communication circuit 404 may communicate the data acquisition command signal according to a wireless communication protocol, such as the Bluetooth® technology standard or the like. In an embodiment, a data acquisition command signal is communicated by the wireless communication circuit 404 each time the selection button 220 is triggered. The data acquisition command signal may be an electromagnetic signal that comprises data or information indicating to the AR imaging device 104 that the selection button 220 has been activated.

The AR imaging device 104 includes the one or more sensors 406, a control unit 408 with the one or more processors 410 and a memory 412, a display device 414, and a wireless communication circuit 416. The sensors 406 may include one or more image/video cameras, range finders (e.g., proximity sensors), infrared (IR) sensors, or the like. The sensors 406 are used for monitoring the surrounding environment of the AR imaging device 104, allowing for positional tracking of the AR imaging device 104 in the environment as well as tracking the fiducial marker 112 (FIG. 1) of the alignment tool 106.

The one or more processors 410 of the control unit 408 may control operation of at least some of the different components of the AR imaging device 104. Each of the one or more processors 410 may include a microprocessor, controller, or equivalent control circuitry. The memory 412 may include or represent a physical, non-transitory, computer-readable storage device that stores data on a temporary or permanent basis for use by the processors 410 and/or for remote communication. For example, the one or more processors 410 may operate based on programmed instructions (e.g., software) that are stored in the memory 412 or another non-transitory computer-readable storage medium. The memory 412 may include one or more volatile and/or non-volatile memory devices, such as random access memory (RAM), static random access memory (SRAM), dynamic RAM (DRAM), another type of RAM, read only memory (ROM), flash memory, or the like. The memory 412 may be configured to store, at least temporarily, data collected by the sensors 406. For example, the memory 412 may store image data captured by one or more cameras on the AR imaging device 104. The memory 412 may also be used to store mapping data that represents a spatial coordinate-based map of the surrounding environment (e.g., the physical workspace 102 shown in FIG. 1). The memory 412 may also store positional data representing coordinates of one or more specific locations in the spatial map of the environment. The control unit 408 is operatively connected (e.g., via a wired or wireless communication pathway) to the sensors 406, the display device 414, and the wireless communication circuit 416.

The wireless communication circuit 416 is configured to remotely wirelessly communicate (e.g., transmit and/or broadcast) with the alignment tool 106, such as to receive the data acquisition command signals from the alignment tool 106. The wireless communication circuit 416 may also be configured to communicate with another device, such as a remote computing device. The wireless communication circuit 416 may include an antenna and associated circuitry, such as a receiver, a transceiver, or the like.

The display device 414 may be integrated into the transparent or translucent visor 110 (shown in FIG. 1) of the optical see-through AR imaging device 104. In alternative embodiment in which the AR imaging device 104 is a tablet computer, a smartphone, or the like, the display device 414 may be a monitor or a touchscreen display of the AR imaging device 104. In an embodiment, the one or more processors 410 may be configured to display augmented-reality content on the display device 414, such as a virtual object superimposed onto a live video feed showing the physical workspace 102 (FIG. 1) surrounding the operator. The virtual object may be displayed in three dimensions.

It is recognized that the sensors 406, display device 414, and communication circuit 416 shown in FIG. 4 are merely example components of the AR imaging device 104, and the control unit 408 may be operatively connected to additional components, fewer components, and/or different components in other embodiments.

Figure 5:
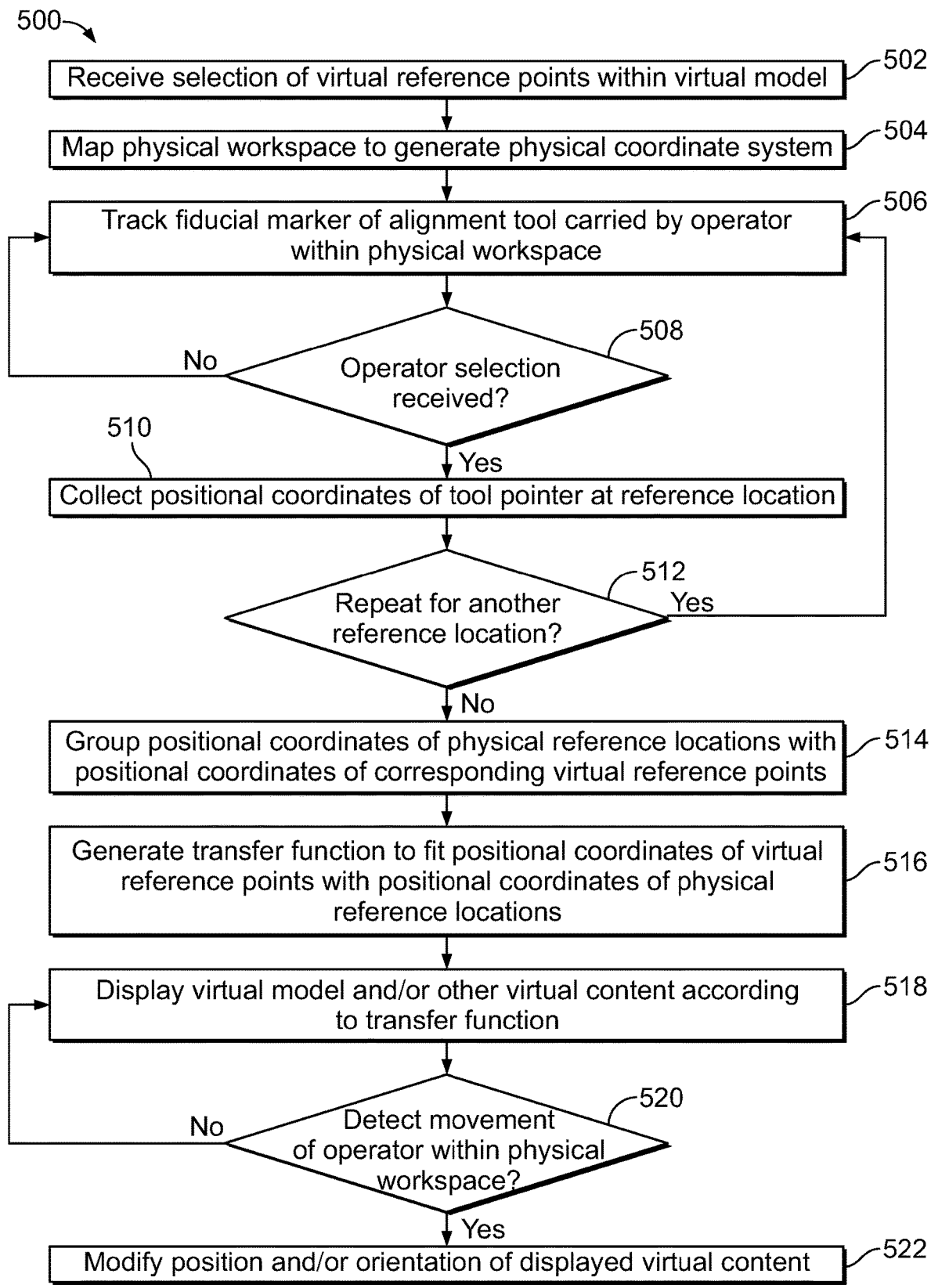
FIG. 5 is a flow chart of a method of aligning virtual content with a physical workspace in an augmented reality platform according to an embodiment of the present disclosure.

FIG. 5 is a flow chart of a method 500 of aligning virtual content with a physical workspace in an augmented reality platform according to an embodiment. The method 500 may be performed by the alignment system 100, or components thereof, shown in FIGS. 1-4. For example, the method 500 may be performed entirely, or in part, by the one or more processors 410 of the AR imaging device 104. At 502, selection of virtual reference points within a virtual model is received. The virtual reference points are distinct, spaced-apart points of the virtual model. In an embodiment, at least three virtual reference points are selected. At least some of the reference points are not located on a single, common line. The virtual model may be a computer-aided design (CAD) model. The virtual model may represent a physical workspace, such as an aircraft, a building, an industrial facility, or the like. The virtual reference points each have unique positional coordinates within a virtual coordinate system or reference frame. In an embodiment, the positional coordinates are three-dimensional positional coordinates defined along three mutually-perpendicular axes within the virtual coordinate system. In an embodiment, the virtual reference points are selected by an operator using a computing device that is separate and remote from the AR imaging device 104. The virtual reference points may be received from the remote computing device by the wireless communication circuit 416 (FIG. 4) of the AR imaging device 104. Alternatively, the virtual reference points in the virtual model may be selected by an operator using the display device 414 that is integrated onto the AR imaging device 104. In another alternative embodiment, the virtual reference points may be selected automatically via the AR imaging device 104 or a remote computing device.

Figure 6:
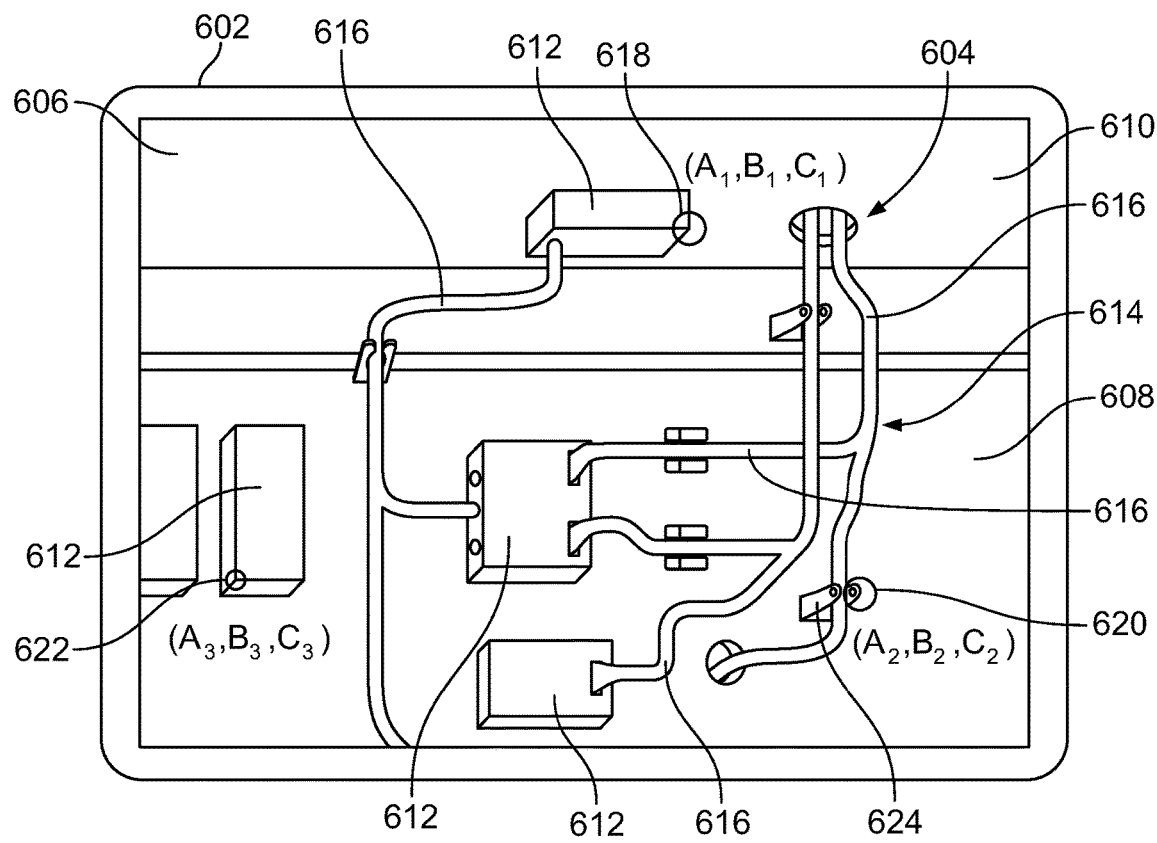
FIG. 6 illustrates a display device that displays a virtual model on a display screen according to an embodiment of the present disclosure.

FIG. 6 illustrates a display device 602 that displays a virtual model 604 on a display screen 606 according to an embodiment. In one embodiment, the display device 602 is remote from the AR imaging device 104 and used by an operator to select the three or more virtual reference points on the virtual model 604. For example, the display device 602 may be a tablet computer, and the display screen 606 may be a touch-sensitive screen. The display device 602 may be discrete from the alignment system 100, and may not be needed for receiving the selection of virtual reference points at 502 of the method 500. In another embodiment, the display device 602 may represent the display device 414 (FIG. 4) of the AR imaging device 104, such that the virtual model 604 is displayed on the AR imaging device 104.

In the illustrated embodiment, the virtual model 604 represents an interior space within an aircraft, including a wall 608, a ceiling 610, and various components mounted to the wall 608 and ceiling 610. The components include electrical devices 612 and a wire harness 614. The wire harness 614 includes multiple electrical cables 616 used to electrically connect the electrical devices 612. Three virtual reference points 618, 620, 622 are highlighted on the display screen 606 at different locations in the virtual model 604. For example, a first virtual reference point 618 is located at a corner of an electrical device 612 mounted to the ceiling 610. A second virtual reference point 620 is located at an end of a fastener 624 mounted to the wall 608 that secures one of the electrical cables 616 in place. A third virtual reference point is located at a corner of an electrical device 612 mounted to the wall 608. The display device 602 shows the positional coordinates of each of the virtual reference points 618, 620, 622 next to the points 618, 620, 622. The three axes in the virtual coordinate system are identified as "A", "B", and "C." The three axes may represent a vertical axis, a horizontal or lateral axis, and a longitudinal or depth axis. Alternatively, the axes may represent aircraft axes, such as a butt line, a water line, and a station line. The first reference point 618 has positional coordinates $(A_1, B_1, C_1)$, the second reference point 620 has positional coordinates $(A_2, B_2, C_2)$, and the third reference point 622 has positional coordinates $(A_3, B_3, C_3)$. In an embodiment, the virtual reference points may be spaced apart from one another by a distance of at least one meter, and optionally may be separated by distances of at least two or more meters.

Referring now back to the method 500 at FIG. 5, at 504 a physical workspace is mapped to generate a physical coordinate system. For example, the AR imaging device 104 may be configured to spatially map the physical workspace in which the AR imaging device 104 is located based on sensor data received from the sensors 406. For example, as the operator with the AR imaging device 104 moves around within the physical workspace, the AR imaging device 104 may be configured to map the surroundings and generate a physical coordinate system or reference frame that represents the physical workspace. The physical coordinate system may be based on the position of the AR imaging device 104. For example, the mapping establishes a relationship between the position of the AR imaging device 104 and the positions of specific real-life objects within the surrounding environment such that, upon mapping the physical workspace, the real-life objects are assigned specific positional coordinates within the physical coordinate system. The operator wearing the AR imaging device 104 optionally may be the same operator that selects the virtual reference points within the virtual model at 502.

Figure 7:
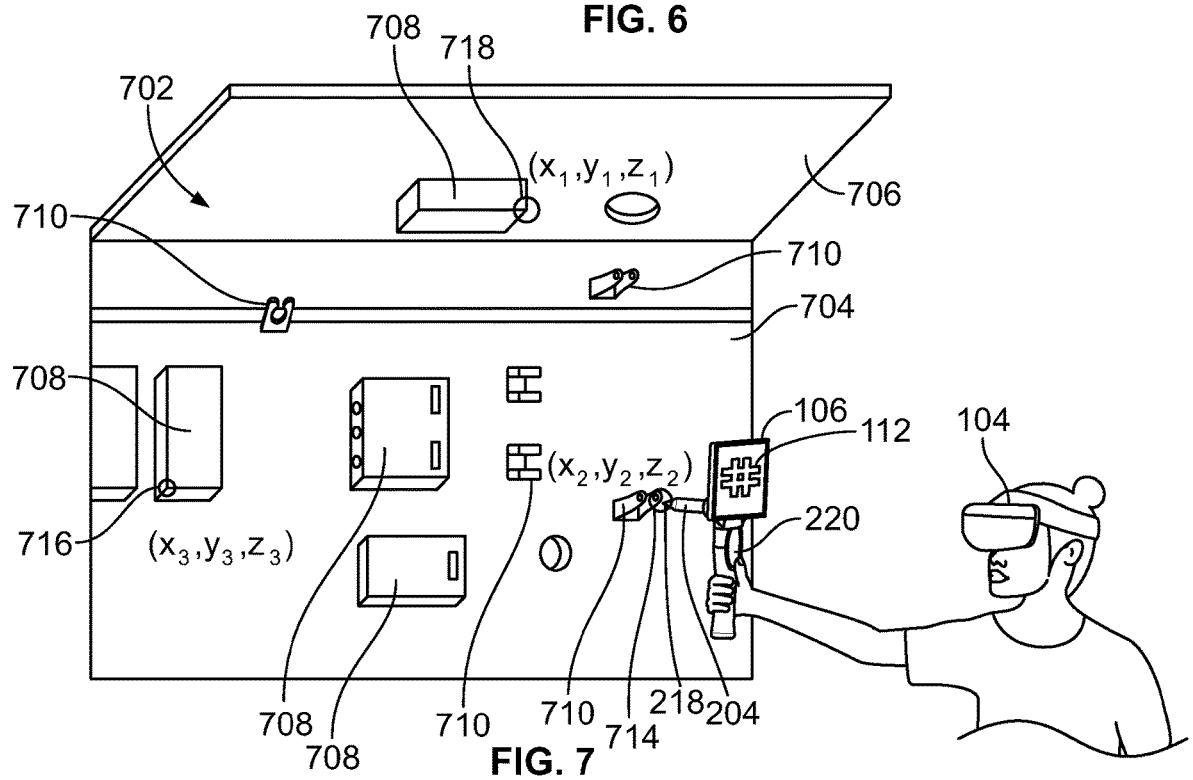
FIG. 7 illustrates an operator carrying the alignment tool within a physical workspace according to an embodiment of the present disclosure.

At 506, a fiducial marker of an alignment tool carried by an operator is tracked within the physical workspace that is mapped. For example, FIG. 7 illustrates an operator carrying the alignment tool 106 within a physical workspace 702 according to an embodiment. The physical workspace 702 in the illustrated embodiment is an interior space within an aircraft. The aircraft may be in an incomplete state, such that the interior space is under construction. The physical workspace 702 corresponds to the virtual model 604 shown in FIG. 6. For example, the virtual model 604 may be a virtual representation of the physical workspace 702 in the completed state. The physical workspace 702 includes a wall 704 and a ceiling 706. There are several electrical devices 708 and fasteners 710 mounted on the wall 704 and ceiling 706, but there is no wire harness in the intermediary state.

As shown in FIG. 7, the operator wears the AR imaging device 104 and holds the alignment tool 106. The sensors 406 (FIG. 4) of the AR imaging device 104 are configured to track the fiducial marker 112 of the alignment tool 106 within the physical workspace 702. In an embodiment, the operator moves the alignment tool 106 such that the tip 218 of the pointer 204 is located at each of multiple reference locations in the physical workspace 702 that are associated with the virtual reference points 618, 620, 622 from the virtual model 604 shown in FIG. 6. For example, in FIG. 7, the operator positions the alignment tool 106 such that the tip 218 is disposed at a reference location 714 at the end of a fastener 710 on the wall 704. The reference location 714 is a second reference location that is associated with the second virtual reference point 620 at the fastener 624 mounted to the wall 608 of the virtual model 604 (shown in FIG. 6).

Referring back to FIG. 5, at 508, a determination is made whether an operator selection is received. The operator selection may be an electrical signal, an audible command, a gesture, or the like, communicated to the AR imaging device 104. The operator selection instructs the AR imaging device 104 to collect and record positional coordinates of the current location of the tip 218 of the pointer 204. For example, the operator selection may be the data acquisition command signal communicated from the communication circuit 404 (FIG. 4) of the alignment tool 106 responsive to the operator pressing the selection button 220. Alternatively, the operator selection may be a specific voice command of the operator that is received by a microphone (not shown) on the AR imaging device 104, or the like. If no operator selection is received, flow of the method 500 returns to 506, and the fiducial marker 112 continues to be tracked.

If, on the other hand, the operator selection is received, then flow of the method 500 proceeds to 510. At 510, positional coordinates of the pointer 204 of the alignment tool 106 are collected at the reference location. For example, referring to FIG. 7, in response to the operator pressing the selection button 220 on the alignment tool 106, the AR imaging device 104 may be configured to collect and record the positional coordinates that correspond to the current location of the tip 218 of the pointer 204. The AR imaging device 104 may determine the location of the tip 218 in the physical workspace 702 based on image analysis to determine the distance and orientation of the fiducial marker 112 relative to the AR imaging device 104. The position of the tip 218 relative to the fiducial marker 112 is predetermined and known, which allows the AR imaging device 104 to determine the relative position of the tip 218 to the AR imaging device 104. The AR imaging device 104 uses inside-out positional tracking to determine the current position and angular orientation of the AR imaging device 104 within the physical workspace 702, and by extension determines the current position of the tip 218.

The position of the tip 218 is determined in positional coordinates within the physical coordinate system mapped by the AR imaging device 104. In the illustrated embodiment, the physical coordinate system is three-dimensional and includes three mutually-perpendicular axes represented by "X", "Y", and "Z". The axes X, Y, and Z may represent aircraft coordinate axes, such as butt line, water line, and station line. The positional coordinates of the second reference location 714 pointing to the fastener 710 shown in FIG. 7 are determined to be $(X_2, Y_2, Z_2)$. The AR imaging device 104 may record the positional coordinates of the second reference location 714 within the memory 412 (FIG. 4) or another storage device.

After collecting the positional coordinates of the reference location, the method 500 proceeds to 512 and a determination is made whether to repeat for another reference location. The collection process may be repeated to collect the positional coordinates of each reference location that is associated with one of the selected virtual reference points in the virtual model received at 502. For example, the collection process is repeated to collect the positional coordinates at each reference location in the physical workspace 702 associated with the virtual reference points 618, 620, 622 shown in FIG. 6. For example, the collection process may repeat until the positional coordinates at three or more reference locations in the physical workspace 702 are collected.

Referring to FIG. 7, after collecting the positional coordinates at the second reference location 714, the operator may move the alignment tool 106 within the physical workspace 702 towards another reference location 716 that is associated with the third virtual reference point 622 in the virtual model 604. The operator moves the alignment tool 106 such that the tip 218 of the pointer 204 rests at a corner of the electrical device 708 on the wall 704 that corresponds to the electrical device 612 mounted to the wall 608 in the virtual model 604 shown in FIG. 6. The AR imaging device 104 continues to track the fiducial marker 112 (at 506), and in response to receiving the operator selection (at 508), determines the positional coordinates of the reference location 716 within the physical coordinate system. For example, the positional coordinates for the third reference location 716 are shown as $(X_3, Y_3, Z_3)$. The collection process is repeated again to collect the positional coordinates of at a first reference location 718 that is associated with the first virtual reference point 618 in the virtual model 604. The coordinates at the first reference location 718 are $(X_1, Y_1, Z_1)$. The positional coordinates of the physical reference locations 714, 716, 718 may be collected in any order (as long as each of the physical reference locations 714, 716, 718 is associated with the corresponding virtual reference point 620, 622, 618).

Referring to the method 500 at FIG. 5, once the positional coordinates of each of the reference locations 714, 716, 718 corresponding to the different virtual reference points 618, 620, 622 are determined, the method 500 proceeds to 514 and positional coordinates of the physical reference locations are grouped with positional coordinates of the corresponding virtual reference points. For example, the one or more processors 410 of the AR imaging device 104 may group the positional coordinates $(A_1, B_1, C_1)$ of the first virtual reference point 618 in the virtual model 604 with the positional coordinates $(X_1, Y_1, Z_1)$ of the first reference location 718 in the physical workspace 702. The one or more processors 410 also groups the positional coordinates $(A_2, B_2, C_2)$ with the coordinates $(X_2, Y_2, Z_2)$, and the positional coordinates $(A_3, B_3, C_3)$ with the coordinates $(X_3, Y_3, Z_3)$. It is recognized that the positional coordinates of the virtual reference points 618, 620, 622 are defined within the virtual coordinate system, which is different than the physical coordinate system in which the positional coordinates of the physical reference locations 714, 716, 718 are defined.

At 516, a transfer function is generated to fit the positional coordinates of the virtual reference points with the positional coordinates of the physical reference locations. For example, the one or more processors 410 of the AR imaging device 104 may utilize an algorithm, such as a least squares fit algorithm or the like, to the point pairs. The one or more processors 410 may determine a transformation or transfer function that includes rotation and translation of the virtual coordinate system in order to reduce the errors between individual point pairs, and thereby align or spatially-register the virtual coordinate system to the physical coordinate system.

At 518, the virtual model 604 shown in FIG. 6 and/or other virtual content is displayed according to the transfer function such that the virtual model and/or content align with the physical workspace on the display. For example, at least a portion of the virtual model 604 may be superimposed onto a live view of the physical workspace. Although the virtual model 604 is used to generate the transfer function, the transfer function may be used to display virtual content that is different from the virtual model 604 instead of, or in addition to, displaying the virtual model 604. The virtual model 604 and/or other virtual content may be displayed as three-dimensional images or objects. The display may be the display device 414 that is integrated onto the visor 110 of the AR imaging device 104 and viewable by the operator wearing the AR imaging device 104. Alternatively, the virtual model 604 and/or other virtual content may be displayed on a separate and discrete display device instead of, or in addition to, displaying the virtual content on the integrated display device 414.

Figure 8:
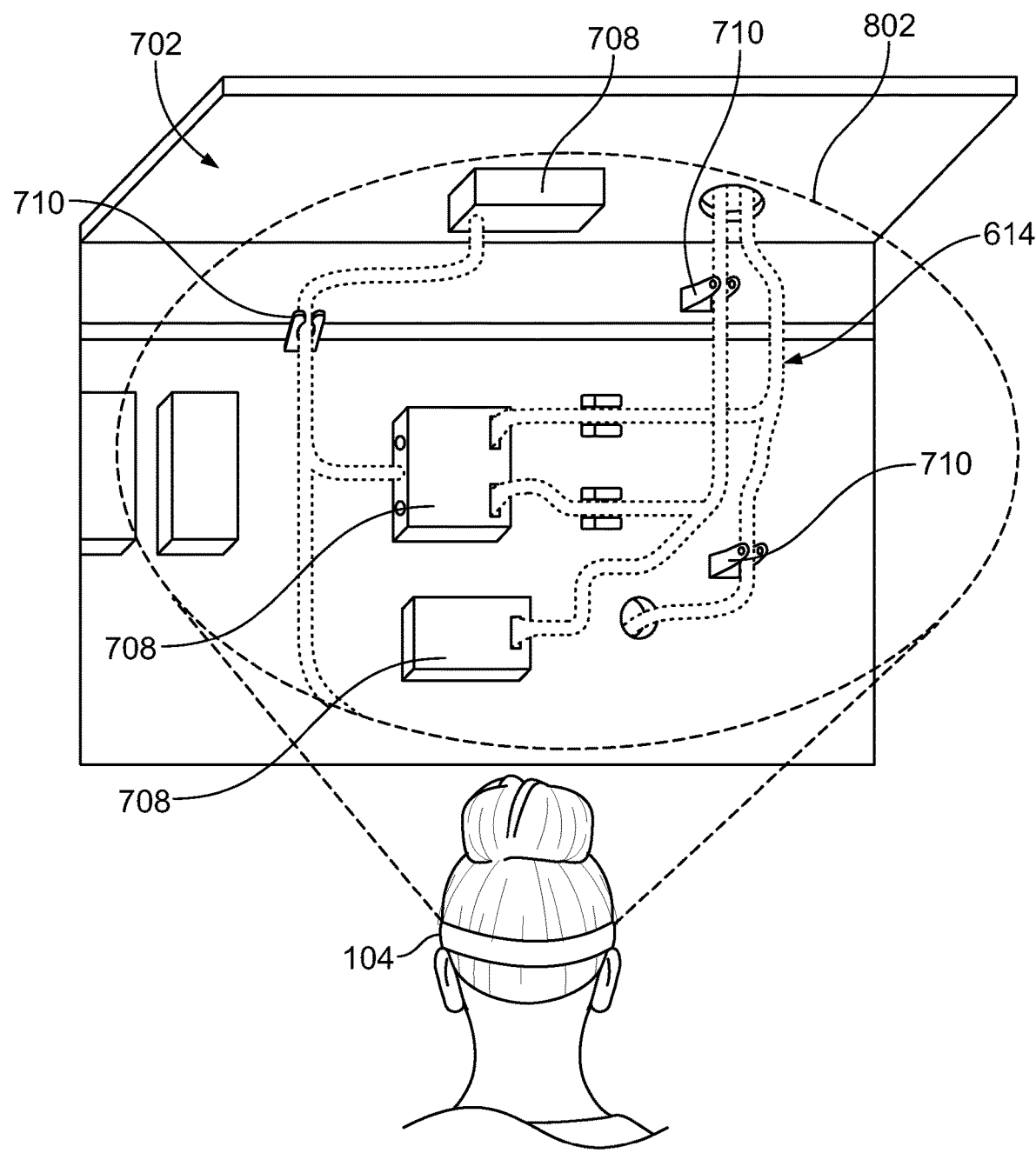
FIG. 8 illustrates a field of view of an AR imaging device of the virtual content alignment system that is worn by the operator in the physical workspace shown in FIG. 7.

For example, FIG. 8 illustrates a field of view 802 of the AR imaging device 104 worn by the operator in the physical workspace 702 shown in FIG. 7. The field of view 802 indicates what the operator sees on the integrated display device 414 (FIG. 4) of the AR imaging device 104. The field of view 802 shows the physical workspace 702 in the intermediary state, as shown in FIG. 7, with the addition of the wire harness 614 of the virtual model 604 shown in FIG. 6. For example, the physical workspace 702 in the field of view 802 may be a live video feed, and the wire harness 614 may be a three-dimensional virtual image or object that is super-imposed on the live video feed. The virtual wire harness 614 is shown in phantom in FIG. 8. The virtual wire harness 614 is superimposed by applying the transfer function to align and spatially-register the wire harness 614 from the virtual coordinate system to the physical coordinate system. As shown in FIG. 8, the virtual wire harness 614 aligns accurately with the electrical devices 708 and fasteners 710 in the physical workspace 702, although the wire harness 614 is virtual (e.g., not physically located in the physical workspace 702). By displaying the wire harness 614 in the physical workspace 702 during construction of the physical workspace 702, the AR imaging device 104 may instruct the operator how to install actual, real-life electrical cables of a wire harness within the physical workspace 702.

It is recognized that the transfer function generated at 516 of the method 500 may be used to display additional virtual content other than the virtual model 604. For example, although the virtual reference points used to generate the transfer function were selected from the virtual model, the transfer function may be used to align any virtual content that uses the virtual coordinate system with the physical coordinate system of the physical workspace. The transfer function calibrates the virtual coordinate system to the physical coordinate system. Once the calibration is known, the transfer function may be applied to other virtual models representing different parts of an aircraft, for example, in order to spatially-register virtual content from these other virtual models with the physical workspace.

Referring back to FIG. 5, at 520 it is determined whether the operator has moved within the physical workspace. For example, the sensors 406 (FIG. 4) of the AR imaging device 104 continually monitor the position of the AR imaging device 104 within the physical workspace using inside-out positional tracking. Based on the positional tracking, the AR imaging device 104 can determine when the operator moves relative to the physical workspace, such as by turning (e.g., rotating) or walking (e.g., translating). If it is determined that the operator has moved, then flow proceeds to 522 and the position and/or orientation of the displayed virtual content is modified. For example, with reference to FIG. 8, the AR imaging device 104 is configured to modify the displayed position and orientation of the virtual wire harness 614 relative to the physical workspace 702 based on the perceived rotation and/or translation of the AR imaging device 104, such that the virtual wire harness 614 appears realistic to the operator in the field of view 802. For example, the AR imaging device 104 may determine the updated position and angular orientation of the AR imaging device 104 within the physical coordinate system, and may make similar changes to the position and orientation of the virtual content (e.g., the wire harness 614) since the virtual content is already spatially-registered within the physical coordinate system.

It is recognized that any changes in how the virtual content is displayed are based solely on the positional tracking of the AR imaging device 104 relative to the physical workspace. Unlike some known methods for aligning virtual content in an augmented-reality platform, the alignment system 100 described herein does not rely on tracking a position and orientation of a physical marker in the workspace to determine how to align virtual content with the physical workspace. For example, current AR systems that visually track a designated marker in the physical environment rely on tracking both the position and rotation of the marker. But, the automated AR systems are prone to tracking errors, especially with respect to rotation of the marker. These tracking errors result in virtual AR content that is misaligned relative to the physical environment. The virtual content alignment errors are magnified for virtual content rendered at significant distances (e.g., at least three meters) from the marker origin due to increasingly pronounced lever-arm effects (e.g., small tracking errors are magnified proportional to the distance from the marker). The alignment system 100 described herein does not rely on positional and rotational tracking of a physical marker, so the alignment system 100 does not suffer from the virtual content misalignment caused by marker tracking errors.

Figure 9:
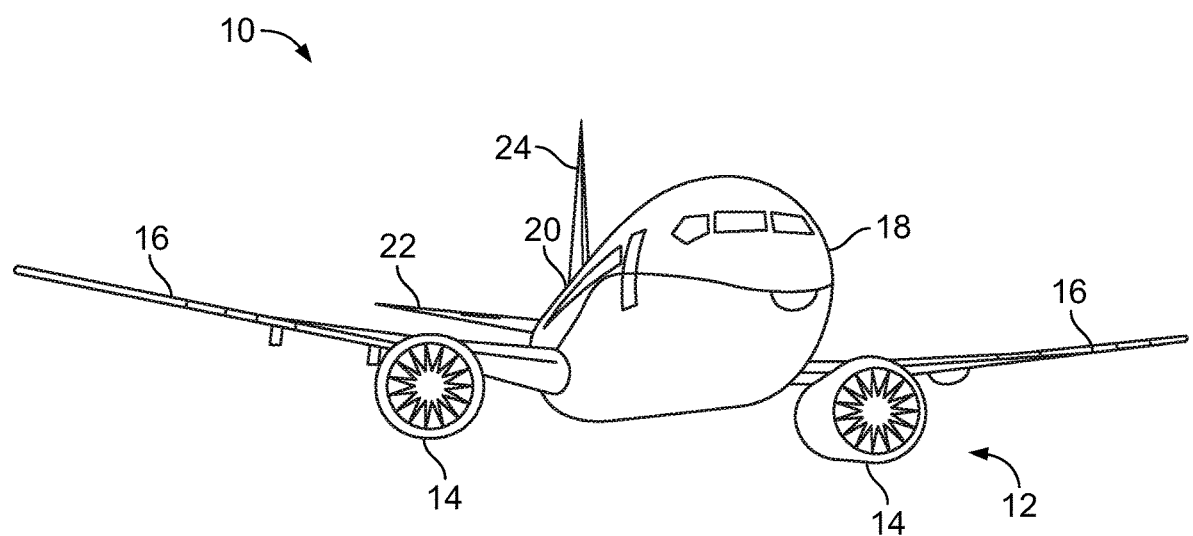
FIG. 9 illustrates a front perspective view of an aircraft according to an embodiment of the present disclosure.

FIG. 9 illustrates a front perspective view of an aircraft 10 according to an embodiment of the present disclosure. The aircraft 10 may be an implementation of the aircraft shown and described above with reference to FIGS. 7 and 8. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24. The fuselage 18 of the aircraft 10 defines an interior cabin.

Figure 10:
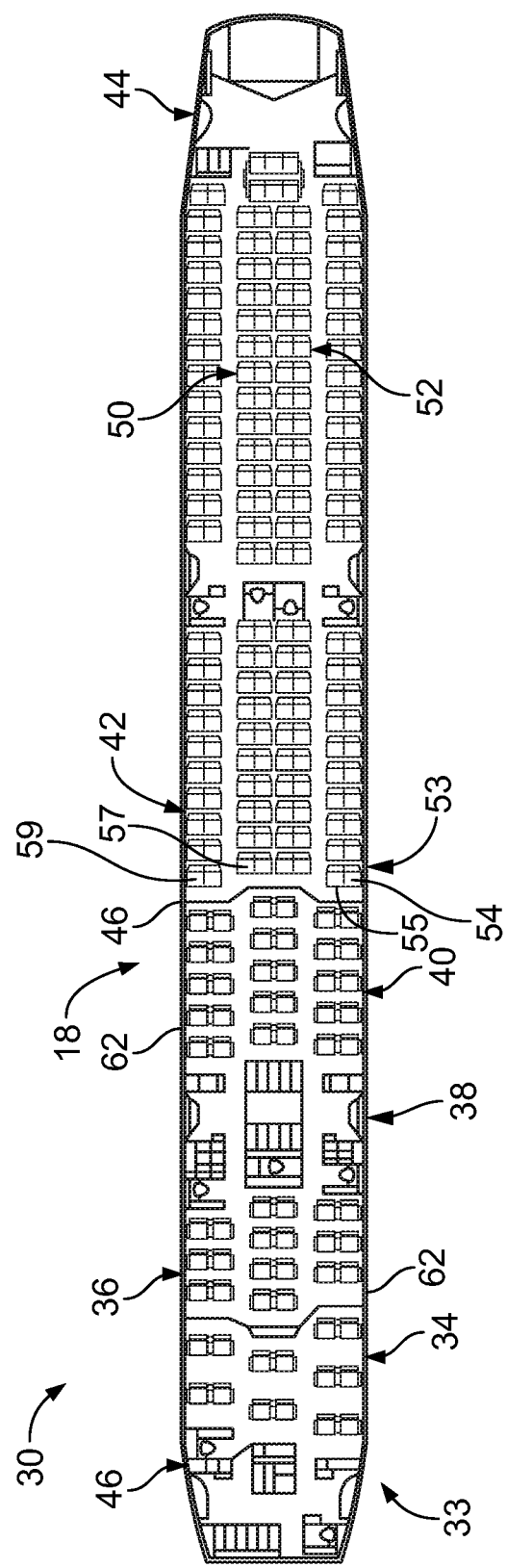
FIG. 10 illustrates a top plan view of an interior cabin of the aircraft shown in FIG. 9 according to an embodiment of the present disclosure.

FIG. 10 illustrates a top plan view of an interior cabin 30 of the aircraft 10 (shown in FIG. 9) according to an embodiment of the present disclosure. The interior cabin 30 is within the fuselage 18. For example, one or more fuselage wall members 62 may define the interior cabin 30. The interior cabin 30 includes multiple sections or zones, including a front section 33, a first class section 34, a business class section 36, a front galley station 38, a business section 40 (e.g., an expanded economy or coach section), a standard economy or coach section 42, and an aft section 44, which may include multiple lavatories and galley stations. It is to be understood that the interior cabin 30 may include more or less sections and zones than shown. For example, the interior cabin 30 may not include a first class section, and may include more or less galley stations than shown. Each of the sections may be separated by a cabin transition area 46, which may include class divider assemblies. Overhead stowage bin assemblies may be positioned throughout the interior cabin 30.

As shown in FIG. 10, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44. The interior cabin 30 includes rows 53 of seats 54 that span across the interior cabin 30 and generally extend across the aisles 50 and 52. Columns 55, 57, and 59 of seat sections extend perpendicular to the rows 53. Each seat section may include one or more seats 54. The columns 55, 57, and 59 generally run parallel with the aisles 50 and 52. A particular section or zone may include any number of columns 55, 57, and 59 of seat sections. As shown in FIG. 10, at least one zone includes three columns 55, 57, and 59 of seat sections. However, each zone may include more or less than three columns.

The interior cabin 30 may be constructed using one or more embodiments of the alignment system 100 and method 500 of aligning virtual content in an augmented reality platform described herein. For example, an operator may wear the AR imaging device 104 and carry the alignment tool 106 within the fuselage 10 during construction of the fuselage 10 and/or interior cabin 30 thereof. The wall 704 and ceiling 706 of the physical workspace 702 shown in FIG. 7 may be fuselage wall members 62 shown in FIG. 10.

Alternatively, instead of an aircraft, embodiments of the alignment system 100 may be used with various other vehicles (e.g., automobiles, buses, locomotives and train cars, sea craft, and spacecraft), in industrial facilities, in houses, and the like.

Referring to FIGS. 1-10, embodiments of the present disclosure provide a virtual content alignment system and method, as well as an alignment tool used by the system during the performance of method. The embodiments of the system and method are configured to provide accurate alignment of virtual content with the real-world environment in augmented reality platforms. The alignment system can be used for virtual content of any size without affecting the accuracy of the alignment. For example, the system and method generate a transfer function to calibrate the virtual coordinate system with a physical coordinate system of the physical environment, so the size and distance of a virtual object from an origin of the physical coordinate system has no effect on the accuracy of the alignment. The transfer function can be subsequently applied to additional virtual content to accurately align the virtual content to the physical environment without re-performing the method of alignment. For example, the operator does not need to utilize the alignment tool to collect the positional coordinates of additional physical reference locations after generating the transfer function, as the transfer function can be used to align any virtual content within the same virtual coordinate system to the physical environment.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and may include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   an alignment tool having a pointer and a fiducial marker, the alignment tool configured to be carried by an operator within a physical workspace; and
   an augmented-reality (AR) imaging device including one or more sensors and one or more processors, the one or more processors configured to track the fiducial marker in the physical workspace using the one or more sensors, and determine positional coordinates of the pointer within a physical coordinate system at each of multiple physical reference locations within the physical workspace based on a position and orientation of the fiducial marker that is tracked, each of the physical reference locations being associated with a different corresponding virtual reference point within a virtual model, wherein the virtual reference points have different respective positional coordinates within a virtual coordinate system of the virtual model,
   wherein the one or more processors are configured to generate a transfer function to register the virtual coordinate system to the physical coordinate system by reducing offsets between the positional coordinates of the virtual reference points and the positional coordinates of the associated physical reference locations, the one or more processors further configured to display virtual content on a display according to the transfer function such that the virtual content is spatially-registered with the physical workspace.

2. The system of claim 1, wherein the positional coordinates of the physical reference locations are defined along three mutually-perpendicular axes in the physical coordinate system.

3. The system of claim 1, wherein the one or more processors are configured to map the physical workspace within the physical coordinate system based on sensor data acquired by the one or more sensors.

4. The system of claim 1, wherein the AR imaging device is an optical see-through head-mounted device configured to be worn by the operator that carries the alignment tool within the physical workspace, the display being integrated onto the AR imaging device and visible to the operator wearing the AR imaging device.

5. The system of claim 1, wherein the physical workspace is an interior space of an aircraft, and the virtual content that is displayed on the display is a virtual representation of one or more parts of the aircraft.

6. The system of claim 1, wherein the alignment tool includes a selection button and a wireless communication circuit, the alignment tool configured to wirelessly communicate a data acquisition command signal responsive to the operator pressing the selection button.

7. The system of claim 6, wherein the one or more processors of the AR imaging device are configured to determine the positional coordinates of the pointer at each of the physical reference locations responsive to receiving the data acquisition command signal from the alignment tool.

8. The system of claim 1, wherein the physical reference locations include at least three locations within the physical workspace that are spaced apart from one another by at least two meters.

9. The system of claim 1, wherein the alignment tool further includes a frame and a handle that is attached to and extends from the frame, the handle configured to be held by the operator carrying the alignment tool, the frame including a front side and a rear side that is opposite the front side, the fiducial marker being mounted on the front side of the frame, the pointer of the alignment tool disposed rearward of the rear side of the frame and extending away from the frame to a tip of the pointer at a distal end of the pointer, the tip located at a fixed, predetermined position relative to the fiducial marker such that the AR imaging device determines a position of the tip within the physical workspace based on the position and orientation of the fiducial marker.

10. The system of claim 1, wherein the one or more processors are configured to group the positional coordinates of the physical reference locations into point pairs with the positional coordinates of the corresponding virtual reference points and generate the transfer function by reducing the offsets between the positional coordinates of the physical reference location and the positional coordinates of the virtual reference point in each of the point pairs.

11. The system of claim 1, wherein the fiducial marker is a two-dimensional graphic indicia.

12. A method comprising:
tracking, using an augmented-reality (AR) imaging device, a fiducial marker on an alignment tool carried by an operator within a physical workspace;
determining positional coordinates of a pointer tip of the alignment tool within a physical coordinate system at each of multiple physical reference locations within the physical workspace, the positional coordinates determined based on a position and orientation of the fiducial marker tracked by the AR imaging device, each of the physical reference locations within the physical workspace being associated with a different corresponding virtual reference point within a virtual model, wherein the virtual reference points have different respective positional coordinates within a virtual coordinate system of the virtual model;
generating a transfer function to register the virtual coordinate system to the physical coordinate system by reducing offsets between the positional coordinates of the virtual reference points and the positional coordinates of the associated physical reference locations; and
displaying virtual content on a display according to the transfer function such that the virtual content is spatially-registered with the physical workspace.

13. The method of claim 12, wherein the display is integrated onto the AR imaging device.

14. The method of claim 12, wherein the virtual content that is displayed on the display is different from the virtual model.

15. The method of claim 12, further comprising mapping the physical workspace within the physical coordinate system using the AR imaging device prior to tracking the fiducial marker on the alignment tool.

16. The method of claim 12, wherein the positional coordinates of the pointer tip at the physical reference locations are each collected responsive to receiving a selection by the operator.

17. The method of claim 12, wherein the physical reference locations include at least three locations within the physical workspace.

18. The method of claim 12, wherein the AR imaging device is an optical see-through head-mounted device including one or more processors, the one or more processors determining of the positional coordinates of the pointer tip at the multiple physical reference locations and generating the transfer function.

19. An alignment tool for spatially-registering virtual content with a physical workspace on a display using an augmented-reality (AR) imaging device, the alignment tool comprising:
a handle configured to be held by an operator,
a frame attached to the handle, the frame having a front side and a rear side that is opposite the front side, the frame having a fiducial marker along the front side that is configured to be recognized by the AR imaging device; and
a pointer coupled to at least one of the handle or the frame and extending rearward beyond the rear side of the frame to a tip of the pointer at a distal end of the pointer, the tip located at a fixed, predetermined position relative to the fiducial marker, such that the AR imaging device determines a position of the tip within the physical workspace by tracking a position and orientation of the fiducial marker.

20. The alignment tool of claim 19, wherein the pointer extends linearly and the tip is tapered to a point.

21. The alignment tool of claim 19, further comprising a selection button on the handle and a wireless communication circuit that is operatively connected to the selection button, the wireless communication circuit configured to wirelessly communicate a data acquisition command signal to the AR imaging device responsive to activation of the selection button.

22. The alignment tool of claim 19, wherein the front side of the frame is planar and the pointer extends generally perpendicular to a plane of the front side of the frame.

* * * * *